US012739167B2

(12) United States Patent
Baniqued et al.

(10) Patent No.: US 12,739,167 B2
(45) Date of Patent: Sep. 15, 2026

(54) AUTOMATED AND STREAMLINED CONFIGURATION FOR MULTI-FUNCTIONAL NETWORK DEVICES

(71) Applicant: Hewlett Packard Enterprise Development LP, Spring, TX (US)

(72) Inventors: Joseph Baniqued, San Jose, CA (US); Piyush Agarwal, Sunnyvale, CA (US); Vaishali Pandya, San Jose, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 31 days.

(21) Appl. No.: 19/050,296

(22) Filed: Feb. 11, 2025

(65) Prior Publication Data

US 2026/0238542 A1 Aug. 13, 2026

(51) Int. Cl.
*H04L 41/0806* (2022.01)
*H04L 41/08* (2022.01)

(52) U.S. Cl.
CPC ...... *H04L 41/0806* (2013.01); *H04L 41/0886* (2013.01)

(58) Field of Classification Search
CPC ........................ H04L 41/0806; H04L 41/0886
See application file for complete search history.

(56) References Cited

U.S. PATENT DOCUMENTS 9,967,852 B2 * 5/2018 Joe ...................... H04L 41/5051
10,045,389 B2 * 8/2018 Kim ...................... H04W 12/50
10,333,777 B2 * 6/2019 Swinkels .............. H04L 41/082
11,695,632 B1 * 7/2023 Zoualfaghari .......... G06F 9/455 709/220
12,256,467 B2 * 3/2025 Reshef .................... H04W 8/24
12,381,784 B1 * 8/2025 Samuel ............... H04L 41/0886
2014/0297820 A1 * 10/2014 Grubis ................. H04W 12/02 709/222
2015/0052578 A1 * 2/2015 Yau ......................... H04L 41/24 726/3
2015/0078200 A1 * 3/2015 Kalkunte ............... H04L 41/12 370/254
2015/0301982 A1 * 10/2015 Martini .................. H04L 67/02 709/220
2015/0373089 A1 * 12/2015 Koss ..................... H04W 12/08 709/205
2018/0176663 A1 * 6/2018 Damaggio .......... H04L 41/0816
2025/0247294 A1 * 7/2025 Boyapalle ........... H04L 41/0846

FOREIGN PATENT DOCUMENTS

EP 4239968 A1 * 9/2023 .......... H04L 43/0811

* cited by examiner

*Primary Examiner* — Javier O Guzman
(74) *Attorney, Agent, or Firm* — Slater Matsil, LLP

(57) ABSTRACT

In certain examples, a method includes receiving, at a cloud management service, telemetry information and other device information from a network device; determining a device function based on the telemetry information and the other device information; determining a location at which the network device is located; selecting a configuration bundle based on the device function and the location; and configuring the network device based on the configuration bundle.

15 Claims, 7 Drawing Sheets

Configuration Distribution Table 270

| Device | Device Function | Location | Configuration Bundle |
|---|---|---|---|
| Network Device Type A-1 | Aggregate Switch | Datacenter | DNS A, AUTH X, POE, ACLs |
| Network Device Type A-2 | Core Switch | Datacenter | DNS A, Routing, ACLs |
| Network Device Type A-3 | Aggregate Switch | Headquarters | DNS B, AUTH Y, POE, ACLs |
| Network Device Type A-4 | Core Switch | Headquarters | DNS B, Routing, ACLs |

FIG. 2C

AUTOMATED AND STREAMLINED CONFIGURATION FOR MULTI-FUNCTIONAL NETWORK DEVICES

BACKGROUND

Devices are often operatively connected to other devices. Such connections between devices are often facilitated via a connection between the devices and a network. A network often includes any number of network devices. Network devices are often configured to propagate information between devices connected to the network. To that end, network devices are often configured with various types of functionalities. The specific types of functionality with which a particular network device is configured often depends on the purpose of the network device.

BRIEF DESCRIPTION OF THE DRAWINGS

Certain examples discussed herein will be described with reference to the accompanying drawings listed below. However, the accompanying drawings illustrate only certain aspects or implementations of examples described herein by way of example, and are not meant to limit the scope of the claims. Aspects of the present disclosure are best understood from the following detailed description when read with the accompanying figures. For a more complete understanding of this disclosure, and advantages thereof, reference is now made to the following descriptions taken in conjunction with the accompanying drawings, in which:

FIG. 2C shows a configuration distribution table, in accordance with one or more examples disclosed herein;

DESCRIPTION

Figure 1:
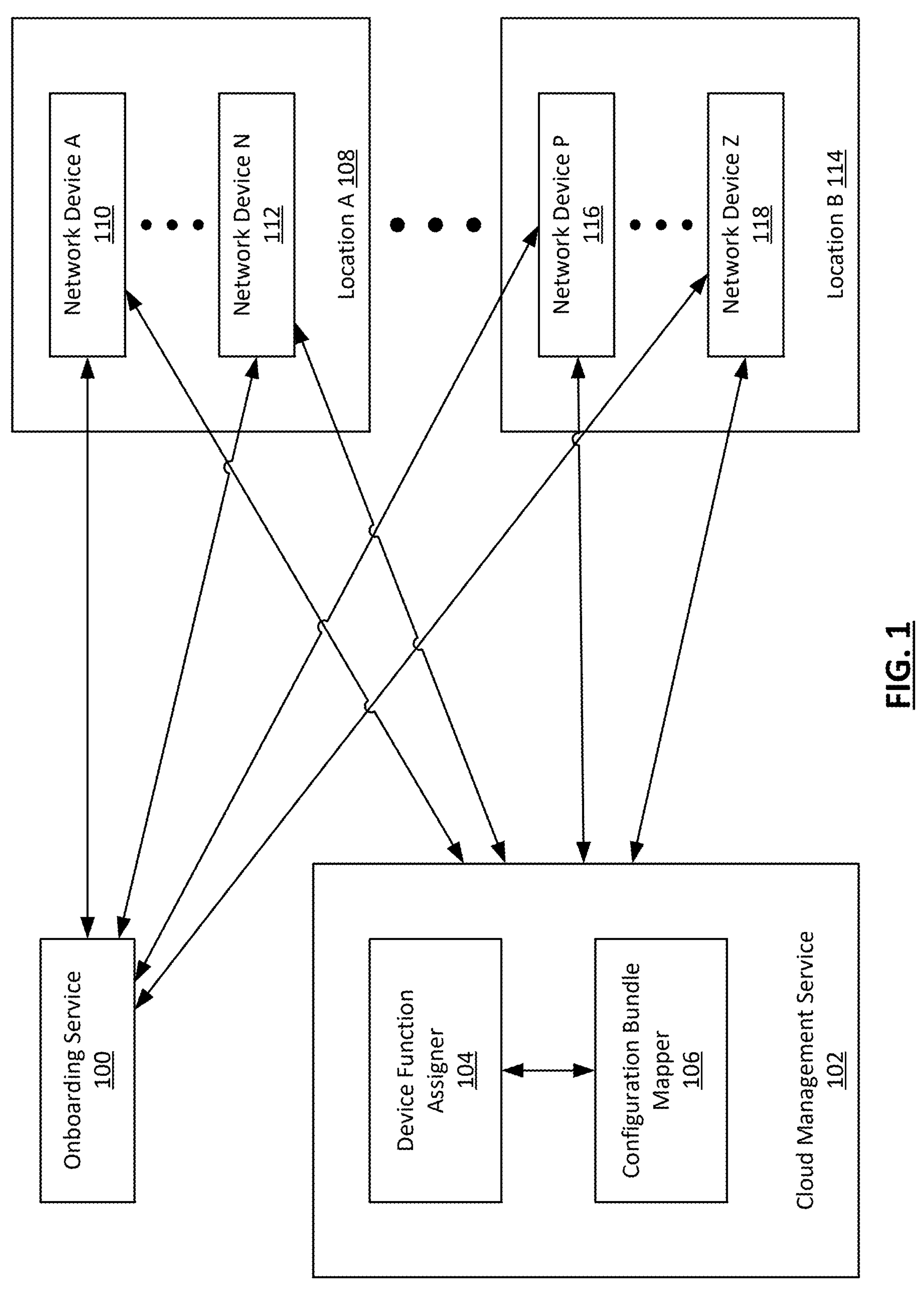
FIG. 1 shows a block diagram of a system for automatically configuring multi-functional network devices, in accordance with one or more examples disclosed herein.

The following disclosure provides many different examples for implementing different features. Specific examples of components and arrangements are described below to simplify the present disclosure. These are, of course, merely examples and are not intended to be limiting.

Network devices are becoming increasingly complex, and may serve a variety of roles and/or functions within a network, depending on the configuration, usage, and/or location of the network devices. As such, even when physical network devices are identical (e.g., the same type, the same model, obtained from the same device vendor at the same time, and the like), the functionality and usage of such devices may vary. As such, to operate as intended, such network devices may need to be configured with a different set of configured functionalities. Thus, effectively managing configuration of network devices is necessary in order to have the network devices operate as intended.

In order to have network devices configured properly for the variety of roles and functions for which they are intended at a given location (e.g., a physical location such as a data center, a company headquarters, a branch office, and the like), prior to examples disclosed herein, network devices were often pre-configured, at least in part, before being deployed at a location. Such pre-configured network devices may, for example, require being configured with different firmware versions, even when the network devices are the same type, model, and the like, in order for the devices to have different sets of functionalities. Such pre-configuration, which may, for example, be performed at a factory where the network devices are produced, which increases the complexity of the manufacturing process and of the process of deploying the network devices for use.

Examples disclosed herein address, at least in part, the above-described and other challenges with provisioning and configuring of network devices to be deployed at various locations by, after network devices are installed at a location, automatically identifying device functions and locations, and using such information to automatically identify and select various functionalities for a network device as a configuration bundle with which to configure the network devices, so that the network devices may be automatically provisioned and configured to perform the functions for which the network devices are intended. In one or more examples, such automatic configuration of the network devices simplifies network device deployment by allowing network devices of the same type to be pre-provisioned with the same firmware, regardless of the roles and functions that will ultimately be deployed on the network devices, and to configure network devices automatically once the network devices are deployed within networks and at physical locations.

In one or more examples, a network device is provided to the physical location at which it is to be deployed. Once the network device is physically deployed, connected to an external connection (e.g., to the Internet) and to other devices in the network, and powered on, the network device may be configured to communicate with an external onboarding service.

The onboarding service may, for example, be hosted by a service provider that provides services for managing network devices and, in some cases, other components of a computing environment. The service provider may also, in some instances, be an entity from which network devices are acquired. In one or more examples, the onboarding service may be configured with information indicating a relationship between network devices and entities that acquired the network devices. As an example, an identifier of a network device (e.g., a serial number) may be associated with a customer that purchased the network device, and may further be associated with any amount or type of other information (e.g., a location at which the network device is to be deployed).

In one or more examples, the communication between the network device and the onboarding service includes the network device providing an identifier of itself (e.g., a serial number) to the onboarding service. The onboarding service may use the network device identifier to look up the information associated with the network device identifier. Based on such information, the onboarding service may identify a cloud management service that is configured to manage network devices for the entity that is deploying the network device. As an example, a particular customer that obtained a number of network devices to be used at various customer location may be associated with a certain instance of a cloud management service configured to provide management services for the customer. Once the cloud management service corresponding to the device identifier is determined, the onboarding service may re-direct the network device to the identified cloud management service, which may include providing to the network device information that allows the network device to communicate with the cloud management service (e.g., a uniform resource locator (URL) that may be used to communicate with the cloud management service).

In one or more examples, the network device then connects to the cloud management service. The cloud management service may then receive information from the network device. Such information may include, but is not limited to, a network device identifier, telemetry information, and any other relevant information about the network device (e.g., the location at which the network device is located). In one or more examples, the telemetry information includes any information that may be obtained by the network device prior to configuration (e.g., when the network device is in a factory default state), such as information about which ports of the network device are active, information about what other devices are connected to the network device (e.g., as discovered using a discovery protocol such as a link layer discovery protocol (LLDP)), information about traffic seen on one or more ports of the network device, such as, for example, protocols being used in network data units (e.g., packets, frames, and the like) of such network traffic, and/or any other relevant information that may be obtained by and/or shared from the network device.

In one or more examples, the cloud management service may then use the information received from the network device, including device characteristics, placement and connectivity of a network device in a network, and/or predefined rules from the entity that is deploying the network device, to determine a device function for the network device. The cloud management service may be configured with any number of different device functions that may be assigned to network devices. Examples of device functions which may be assigned to a network device include, but are not limited to, core switch, aggregate switch, access switch, mobility gateway, branch gateway, virtual private network (VPN) concentrator (VPNC), campus access point (AP), microbranch AP, and the like. In addition to the aforementioned examples, any number of other device functions may be defined and assigned to network devices based on telemetry information and other device information without departing from the scope of examples disclosed herein.

As an example, the information received from a network device may indicate that a network device has an active wired uplink port, and thus may be assigned a device function of a branch gateway. As another example, a network device may have an active uplink port terminating at an Internet Service Provider (ISP) that sees network traffic that uses protocols associated with an ISP, and thus may be assigned a device function of a microbranch AP. As another example, a network device may have multiple high-speed connections to other network devices and process network traffic from a variety of virtual local area networks (VLANs), and thus may be assigned a device function of a core switch. As another example, a network device may have multiple connections to end-points or lower speed network devices, and thus may be assigned a device function of aggregate switch. As another example, a network device with multiple active ports engaged in layer 2 network activity may be assigned a device function of an access switch. One of ordinary skill in the art will appreciate that the foregoing examples are merely examples, and do not limit the types of device functions that may be assigned, or the types of information that may cause such assignments.

In one or more examples, a location at which a network device is deployed may also be determined (e.g., based on information received from the network device). In one or more examples, the device function assigned to a network device, and the location at which a network device is deployed, may be used to determine a configuration bundle to be used for configuring the network device.

In one or more examples, a configuration bundle is a set of configuration definitions for various types of functionality for which a network device may be configured. Examples of such configuration definitions may include, but are not limited to, that a network device is to use a particular domain name system (DNS), that a network device is to be configured with a certain authentication technique, that a network device is to be configured to use Power over Ethernet (POE), that a network device is to be configured to perform routing functions, that a network device is to be configured with certain access control techniques (e.g., access control lists (ACLs), role definitions, and the like), that a network device is to be configured to participate in any number of network protocols, and/or any other types of functionality that may be configured on a network device. Such configuration definitions may be associated with one or more device functions, one or more locations, or a combination of device function and location.

In one or more examples, the cloud management service is configured to map a particular combination of device function and/or location associated with a network device with a configuration bundle that includes one or more configuration definitions, and to cause the network device to be configured according to the identified configuration bundle. Thus, examples disclosed herein may eliminate the need for manual intervention when deploying, provisioning, and configuring new or replacement network devices at a location, as the network devices are automatically configured upon being connected to the network, and, thus, automatically become operational to perform the various types of functionality for which the network devices are intended.

FIG. 1 shows a block diagram of a system for automatically configuring multi-functional network devices in accordance with one or more examples disclosed herein. As shown in FIG. 1, the system includes an onboarding service 100, a cloud management service 102, and any number of locations (e.g., location A 108, location B 114) at which network devices (e.g., network device A 110, network device N 112, network device P 116, network device Z 118) may be located. The cloud management service may include a device function assigner 104 and a configuration bundle mapper 106. Each of these components is described below.

In one or more examples, the onboarding service 100 includes and implements a service provided by a service provider for onboarding devices of any type (e.g., computing device, network device, storage device, and the like) into one or more computing environments. The onboarding service 100 may, in some examples, be provided by the same entity from which the devices are obtained. The devices may be obtained, for example, by customers seeking to deploy computing environments that include networks and, correspondingly, network devices, to facilitate such networks.

Figure 4:
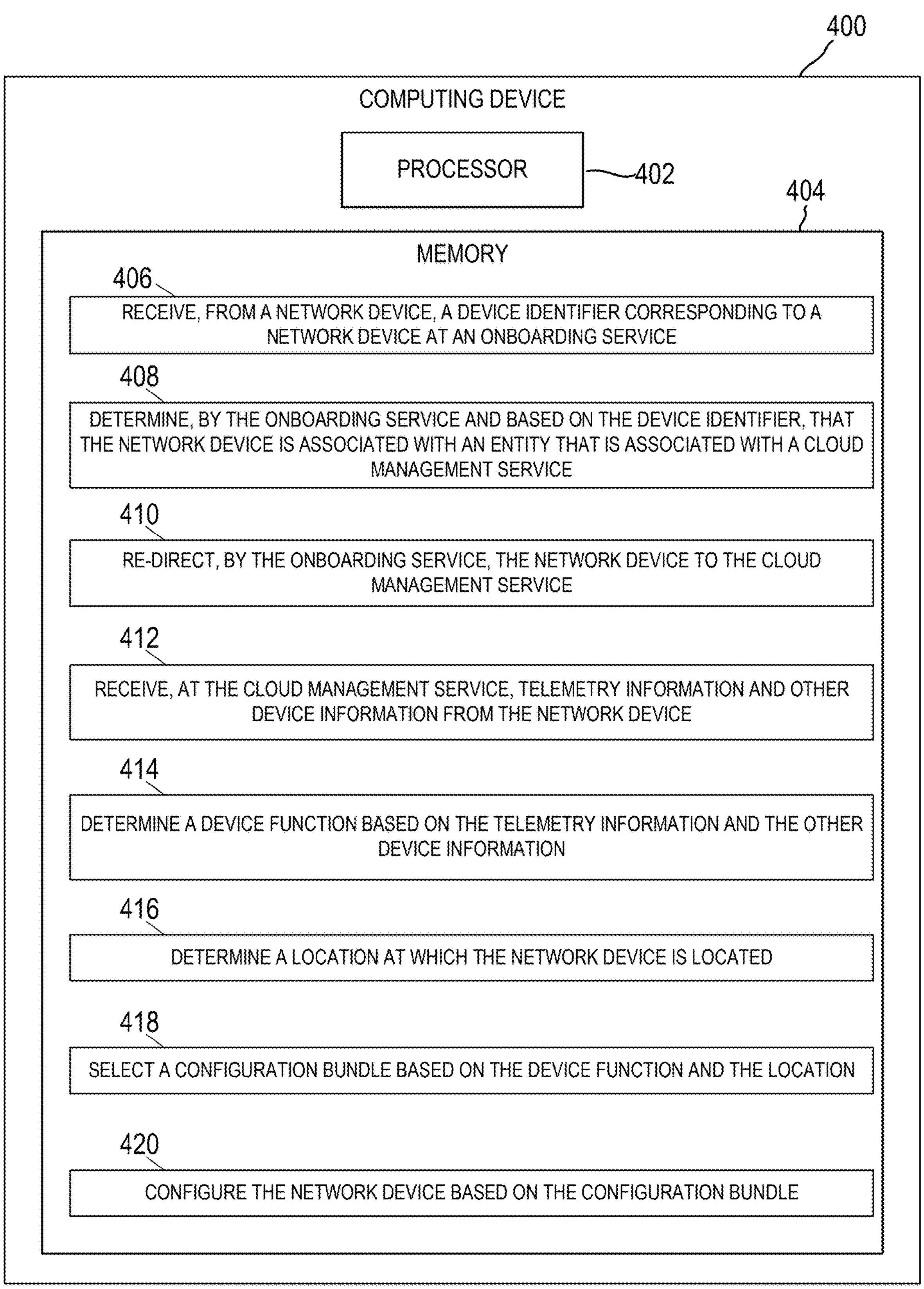
FIG. 4 illustrates a block diagram of a computing device, in accordance with one or more examples disclosed herein.
Figure 5:
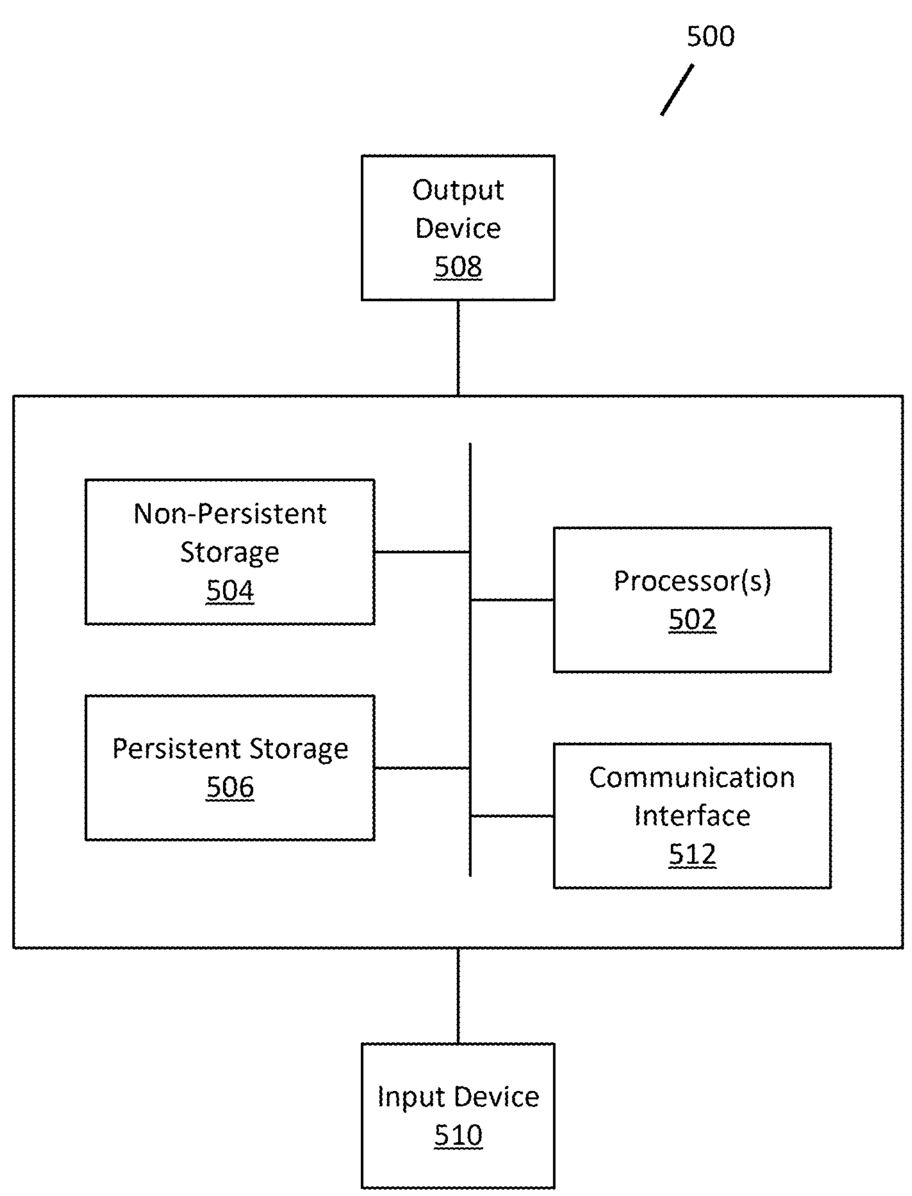
FIG. 5 illustrates a block diagram of a computing device, in accordance with one or more examples disclosed herein.

In one or more examples, the onboarding service 100 is and/or includes a computing device. In one or more examples, as used herein, a computing device may be any single computing device, a set of computing devices, a portion of one or more computing devices, or any other physical, virtual, and/or logical grouping of computing resources. Non-limiting examples of a computing device are shown in FIG. 4 and FIG. 5, which are described below. In one or more examples, a computing device may be any device of any type that is configured to host all or any portion of one or more operating systems, applications, microservices, clustered environment services, storage services, network services, and/or any other computing function, which may include executing instructions, performing operations, executing functions, performing computations, and the like.

In one or more examples, a computing device is any device, portion of a device, or any set of devices capable of electronically processing instructions and may include, but is not limited to, any of the following: one or more processors (e.g. components that include circuitry), memory (e.g., random access memory (RAM)), input and output device(s), non-volatile storage hardware (e.g., solid-state drives (SSDs), persistent memory (Pmem) devices, hard disk drives (HDDs)), one or more physical interfaces (e.g., network ports, storage ports), any number of other hardware components, and/or any combination thereof.

Examples of computing devices include, but are not limited to, a server (e.g., a blade-server in a blade-server chassis, a rack server in a rack, a desktop server, any other type of server device), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, any other type of storage device), a network device, a virtual machine, a virtualized computing environment, a logical container (e.g., for one or more applications), a container pod, an Internet of Things (IoT) device, an array of nodes of computing resources, a supercomputing device, a data center or any portion thereof, any combination of the aforementioned items, and/or any other type of computing device. As one of ordinary skill in the art will appreciate, any of the aforementioned examples of computing devices necessarily require at least some hardware components. As an example, a virtual machine, a container, and/or a container pod, when considered herein as a computing device, or a portion of a computing device, includes the underlying hardware on which the virtual machine, container, and/or a container pod executes.

In one or more examples, the storage and/or memory of a computing device or system of computing devices may be and/or include one or more data repositories for storing any number of data structures storing any amount of data (e.g., information). In one or more examples, a data repository is any type of storage unit and/or device (e.g., a file system, database, collection of tables, RAM, hard disk drive, solid state drive, and/or any other storage mechanism or medium) for storing data. Further, the data repository may include multiple different storage units and/or devices. The multiple different storage units and/or devices may or may not be of the same type or located at the same physical location.

Any storage and/or memory of a computing device or system of computing devices may be considered, in whole or in part, as non-transitory computer readable mediums storing software and/or firmware, which, when executed by one or more processors, cause the one or more processors to perform operations (e.g., execution of one or more computer programs) in accordance with one or more examples disclosed herein.

In one or more examples, the onboarding service 100 is configured to store information that may be used to associate network devices with at least one cloud management service (e.g., the cloud management service 102). As an example, a particular network device may have any number of device identifiers (e.g., a serial number, a product number, a Media Access Control (MAC) address, and the like). The onboarding service may be configured to store an association between such a device identifier and the entity (e.g., a customer) that obtains the particular network device. In turn, the onboarding service may also store a relationship between the entity that obtains the particular network device and a certain instance of a cloud management service (e.g., the cloud management service 102). Thus, in one or more examples, the onboarding service 100 may be configured to determine an association between a device identifier and a cloud management service.

Although the example of FIG. 1 shows a single instance of the onboarding service 100, the system may include any number of instances of an onboarding service without departing from the scope of examples disclosed herein.

In one or more examples, the onboarding service 100 is connected to a network (not shown). As used herein, a network may refer to an entire network or any portion thereof (e.g., a logical portion of the devices within a topology of devices). A network may include a datacenter network, a wide area network, a local area network, a wireless network, a cellular phone network, an InfiniBand network, and/or any other suitable network that facilitates the exchange of information from one part of the network to another (e.g., between devices within and/or connected to the network). A network may be a combination of any of the aforementioned network types. A network may be located at a single physical location or be distributed at any number of physical locations. In one or more examples, a network may be coupled with or overlap with, at least in part, the Internet.

In one or more examples, the onboarding service 100 is configured to receive device identifiers from network devices over a network to which the onboarding service and such network devices are connected, and to use such device identifiers to determine at least one cloud management service (e.g., the cloud management service 102) corresponding to a device identifier received from a network device. In one or more examples, a cloud management service (e.g., the cloud management service 102) is identified, the onboarding service 102 may be configured to re-direct the network device from which the device identifier was received to a cloud management service (e.g., the cloud management service 102). As an example, the onboarding service may provide connection information (e.g., a URL) of the cloud management service to the network device, which may use such connection information to connect to the cloud management service.

In one or more examples, a location (e.g., the location A 108, the location B 114) is any one or more physical or logical location(s) at which network devices may be deployed. Examples of locations include, but are not limited to, datacenters, company offices, entity headquarters, branch offices, home offices, commercial centers, homes, residential areas, geographic regions, and the like. Other locations where network devices may be deployed may be considered a location without departing from the scope of examples disclosed herein.

In one or more examples, a particular location (e.g., the location A 108, the location B 114) includes any number of network devices. As an example, FIG. 1 shows the location A 108 as including the network device A 110 and the network device N 112, with the three dots between the network device A 110 and the network device N 112 indicating that the location A 108 may include any number of network devices. Similarly, the example shown in FIG. 1 includes the location B 114 as including the network device P 116 and the network device Z 118, with the three dots between the network device P 116 and the network device Z 118 indicating that the location B 114 may include any number of network devices. The three dots shown in FIG. 1 between the location A 108 and the location B 114 are intended to indicate that there may be any number of such locations. Although not shown in FIG. 1, in some instances, locations, or devices within locations, may be connected to other locations or devices within other locations.

While FIG. 1 shows locations (e.g., the location A 108, the location B 114) as including network devices (e.g., the network device 108 and the network device 112 at the location A 108, the network device P 116 and the network device Z 118 at location B 114), one of ordinary skill in the art will appreciate that a given location may include any number and/or type of devices, including network devices (as shown), other computing devices, storage devices, management devices, end-user devices, infrastructure components, power components, and the like, without departing from the scope of examples disclosed herein.

As discussed above, a location (e.g., the location A 108, the location B 114) may include network devices (e.g., 110, 112, 116, 118). In one or more examples, a network device (e.g., 110, 112, 116, 118) is a device that includes and/or is operatively connected to persistent storage (not shown), memory (e.g., random access memory (RAM)) (not shown), one or more processor(s) (e.g., integrated circuits, ASICs, and the like) (not shown), and at least one, and often two or more, physical network interface(s) (not shown), which may also be referred to as a port/ports, and which may provide connections (i.e., links) to other devices (e.g., computing devices, other network devices, and the like), over which information (e.g., data) may be transmitted.

In one or more examples, a network device (e.g., 110, 112, 116, 118) also includes any number of additional components (not shown), such as, for example, network chips (not shown), field-programmable gate arrays (FPGAs) (not shown), application specific integrated circuits (ASICs) (not shown), indicator lights (not shown), fans (not shown), power supply units (not shown), power distribution units (not shown), and the like. As an example, at least a portion of such hardware components may be included as part one or more of what may be referred to as line cards of a network device. In one or more examples, a line card, used here merely by way of example, refers to a collection of hardware components (e.g., connected by a printed circuit board) that include one or more physical interfaces (e.g., network ports) and any number of additional hardware components (e.g., ASICs, FPGAs, tertiary content addressable memories (TCAMs), processor components, other memory components, and the like) that are used, at least in part, to store forwarding information and/or otherwise process network traffic. Forwarding information (which may include all or any portion of information that may be referred to as the 'FIB') may, for example, be stored (e.g., in various tables) in one or more hardware components of a network device, such as MAC tables, route table entries, multicast forwarding entries, and the like.

A network device may include information, such as a routing information base (RIB) that includes information (e.g., obtained from various routing protocols) that may be used to program components of the network device to propagate network data units. A network device may include any other components in any arrangement without departing from the scope of examples described herein, and, as such is not limited to any arrangement of components shown in any figure and/or described herein.

In one or more examples, as discussed above, a network device (e.g., 110, 112, 116, 118) includes at least one physical interface (and often two or more such physical interfaces). In one or more examples, physical interfaces are any hardware, software, or combination thereof that include functionality to receive and/or transmit network data units (e.g., packets, frames, and the like) or any other information to and/or from a network device. Physical interfaces may include any interface technology, such as, for example, optical, electrical, and the like. Physical interfaces may be configured to interface with any transmission medium (e.g., optical fiber, copper wire(s), and the like.).

In one or more examples, physical interfaces include and/or are operatively connected to any number of components used in the processing of network traffic. For example, a given physical interface may include a PHY (not shown), which is circuitry that connects a physical information propagation medium (e.g., a wire, not shown) to other components (e.g., the hardware components of a line card), which process network traffic. In one or more examples, physical interfaces include and/or are operatively connected to a transceiver, which provides the connection between the physical information transmission medium and the PHY. A PHY may also include any number of other components, such as, for example a serializer/deserializer (SERDES), and encoder/decoder, and the like. A PHY may, in turn, be operatively connected to other any number of other components, such as, for example, a media access control (MAC) sublayer. Such a sublayer, may, in turn, be operatively connected to still other higher layer processing components, all of which form a series of components used in the processing of network traffic being received, transmitted, or otherwise used by a network device for any purpose.

In one or more examples, a network device (e.g., 110, 112, 116, 118) includes any software (e.g., various daemons, a state database, and the like), firmware, and the like configured to perform and/or allow other components to perform various functions of the network device (e.g., to process network traffic, implement access control, monitor network usage, and the like). Such software may, for example, execute using one or more processors of a network device, or any other hardware resource of a network device capable of executing software.

Examples of a network device (e.g., 110, 112, 116, 118) include, but are not limited to, a switch, a router, a multilayer switch, a fibre channel device, an InfiniBand® device, and the like. A network device is not limited to the aforementioned specific examples. As an example, any computing device (discussed above) may be configured, at least in part, as a network device as used herein.

In one or more examples, a network device includes functionality to receive network data units (e.g., frames, packets, tunneling protocol frames, and the like) at any of the physical interfaces (e.g., ports) of the network device, and to process the network data units (e.g., to receive, transmit, consume, and the like). In one or more examples, processing a network traffic includes, but is not limited to, a series of one or more lookups (e.g., longest prefix match (LPM) lookups, forwarding equivalence class (FEC) lookups, and the like) and corresponding actions (e.g., forward from a certain egress port, add a labeling protocol header, rewrite a destination address, encapsulate, decapsulate, and the like). Examples of network traffic processing include, but are not limited to, determining: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. A network device may perform other operations, functions, and the like with respect to a network data unit without departing from the scope of examples disclosed herein.

A network device (e.g., 110, 112, 116, 118) may be considered a type of computing device that is configured, at least in part, to provide network access and functionality for any number of other devices to which the network device is operatively connected.

A network device (e.g., 110, 112, 116, 118) may be one of any number of network device types. As an example, a certain manufacturer or provider of network devices may make any number of models of switch, router, gateway, access point, and the like. In examples disclosed herein, manufacturing and delivering such network device types may be made simpler by allowing each network device type to be factory configured with a common firmware (e.g., each device has the same firmware version), regardless of what functionality will ultimately be configured on the network device. A particular network device may be configured, using examples disclosed herein, with any number of different types of functionalities, which may depend on the intended use of the network device, the location of the network device, the devices to which the network device is connected, the types of network protocols that the network device will need to process, and the like. Thus, in some examples, even when various network devices are of the same network device type, and factory-configured with the same base firmware version, the network devices may be provisioned and configured differently from one another in order to achieve their intended purpose.

In one or more examples, a system, such as the system shown in FIG. 1, may include the cloud management service 102. In one or more examples, the cloud management service 102 is a computing device (described above) that is configured to provide management services for devices (e.g., network devices) deployed at various locations (e.g., the location A 108, the location B 114). The cloud management service 102 may be provided, for example, by the same service provider that provides the onboarding service 100. In some examples, the cloud management service 102 is operatively connected to network devices (e.g., 110, 112, 116, 118) at any number of locations (e.g., the location A 108, the location B 114) via a network (discussed above).

In one or more examples, the cloud management service 102 is associated with one or more entities that obtain network devices and deploy such network devices at one or more locations. As an example, an entity may acquire any number of network devices, deploy the network devices at any number of locations, and engage a service provider (e.g., an entity from which they network devices are obtained) to provide management services for the network devices via the cloud management service 102.

In one or more examples, the cloud management service 102 is configured to receive connection requests from network devices (e.g., 110, 112, 116, 118) that have been re-directed to the cloud management service 102 by the onboarding service 100 (as discussed above). Although FIG. 1 shows the system as including a single cloud management service 102, there may be any number of instances of a cloud management service without departing from the scope of examples disclosed herein.

In one or more examples, the cloud management service 102 is configured to, after establishing a connection with a network device (e.g., including authenticating the network device), receive information from the network device. Such information may include, but is not limited to, device information (e.g., serial number, MAC address(es), physical configuration information, model, and the like), telemetry information (e.g., information about network traffic seen on one or more ports, information about network protocols used in such network traffic, discovery information about devices connected to the network device, and the like), and any other relevant information (e.g., information identifying the location at which the network device is located).

In one or more examples, the cloud management service 102 includes the device function assigner 104. In one or more examples, the device function assigner 104 is any hardware, or software executing on hardware, that is configured to obtain all or any portion of the information received by the cloud management service 102 from a network device (e.g., 110, 112, 116, 118), and to determine a device function to assign to the network device using the information. As an example, the device function assigner 104 may be a computing device (described above). Although FIG. 1 shows a single instance of the device function assigner 104, the system may include any number of device function assigners without departing from the scope of examples disclosed herein.

In one or more examples, a device function is a label that corresponds to the intended use of the network device within a network. Examples of device functions include, but are not limited to, core switch, aggregate switch, access switch, mobility gateway, branch gateway, virtual private network (VPN) concentrator (VPNC), campus access point (AP), microbranch AP, and the like.

In one or more examples, the device function assigner 104 assesses the information received from a network device (e.g., 110, 112, 116, 118), and assigns a device function based on the assessment. As an example, the information received from a network device (e.g., 110, 112, 116, 118) may indicate that a network device has an active wired uplink port, and thus may be assigned a device function of a branch gateway. As another example, a network device (e.g., 110, 112, 116, 118) may have an active uplink port terminating at an Internet Service Provider (ISP) that sees network traffic that uses protocols associated with an ISP, and thus may be assigned a device function of a microbranch AP. As another example, a network device (e.g., 110, 112, 116, 118) may have multiple high-speed connections to other network devices and process network traffic from a variety of virtual local area networks (VLANs), and thus may be assigned a device function of a core switch. As another example, a network device (e.g., 110, 112, 116, 118) may have multiple connections to end-points or lower speed network devices, and thus may be assigned a device function of aggregate switch. As another example, a network device (e.g., 110, 112, 116, 118) with multiple active ports engaged in layer 2 network activity may be assigned a device function of an access switch. One of ordinary skill in the art will appreciate that the foregoing examples are merely examples, and do not limit the types of device functions that may be assigned, or the types of information that may cause such assignments.

In one or more examples, the cloud management service 102 includes the configuration bundle mapper 106. In one or more examples, the configuration bundle mapper is any hardware and/or software executing on hardware that is configured to determine a configuration bundle to be applied to a network device (e.g., 110, 112, 116, 118) based, at least in part, on the device function assigned to the network device by the device function assigner 104 and/or the location at which the network device is deployed. As an example, the configuration bundle mapper may be a computing device (described above). The device function assigner 104 and the configuration bundle mapper 106 may be separate computing devices of a set of computing devices of the cloud management service 102, may be portions of a computing device that is the cloud management service 102, or may be in any other logical arrangement of computing resources that allow a device function assigned to a network device to be known by the configuration bundle mapper 106.

In one or more examples, the configuration bundle mapper 106 is configured to stope a mapping between various configuration definitions, and a device function and/or location. In one or more examples, a configuration definition is a particular functionality that may be configured on a network device. Examples of a configuration definition include, but are not limited to, that a network device is to use a particular domain name system (DNS), that a network device is to be configured with a certain authentication technique, that a network device is to be configured to use Power over Ethernet (POE), that a network device is to be configured to perform routing functions, that a network device is to be configured with certain access control techniques (e.g., access control lists (ACLs), role definitions, and the like), that a network device is to be configured to participate in any number of network protocols, and/or any other types of functionality that may be configured on a network device. Such configuration definitions may be associated with one or more device functions, one or more locations, or a combination of device function and location. In one or more examples, a particular set of configuration definitions may be referred to as a configuration bundle. In one or more examples, a configuration bundle may be applied to a network device to configure the network device.

While FIG. 1 shows a particular configuration of components, other configurations may be used without departing from the scope of examples described herein. For example, although FIG. 1 shows certain components as part of the same device, any of the components may be grouped in sets of one or more components which may exist and execute as part of any number of separate and operatively connected devices. As another example, a single component may be configured to perform all or any portion of the functionality performed by all or nay portion of the components shown in FIG. 1. Accordingly, examples disclosed herein should not be limited to the configuration of components shown in FIG. 1.

Figure 2A:
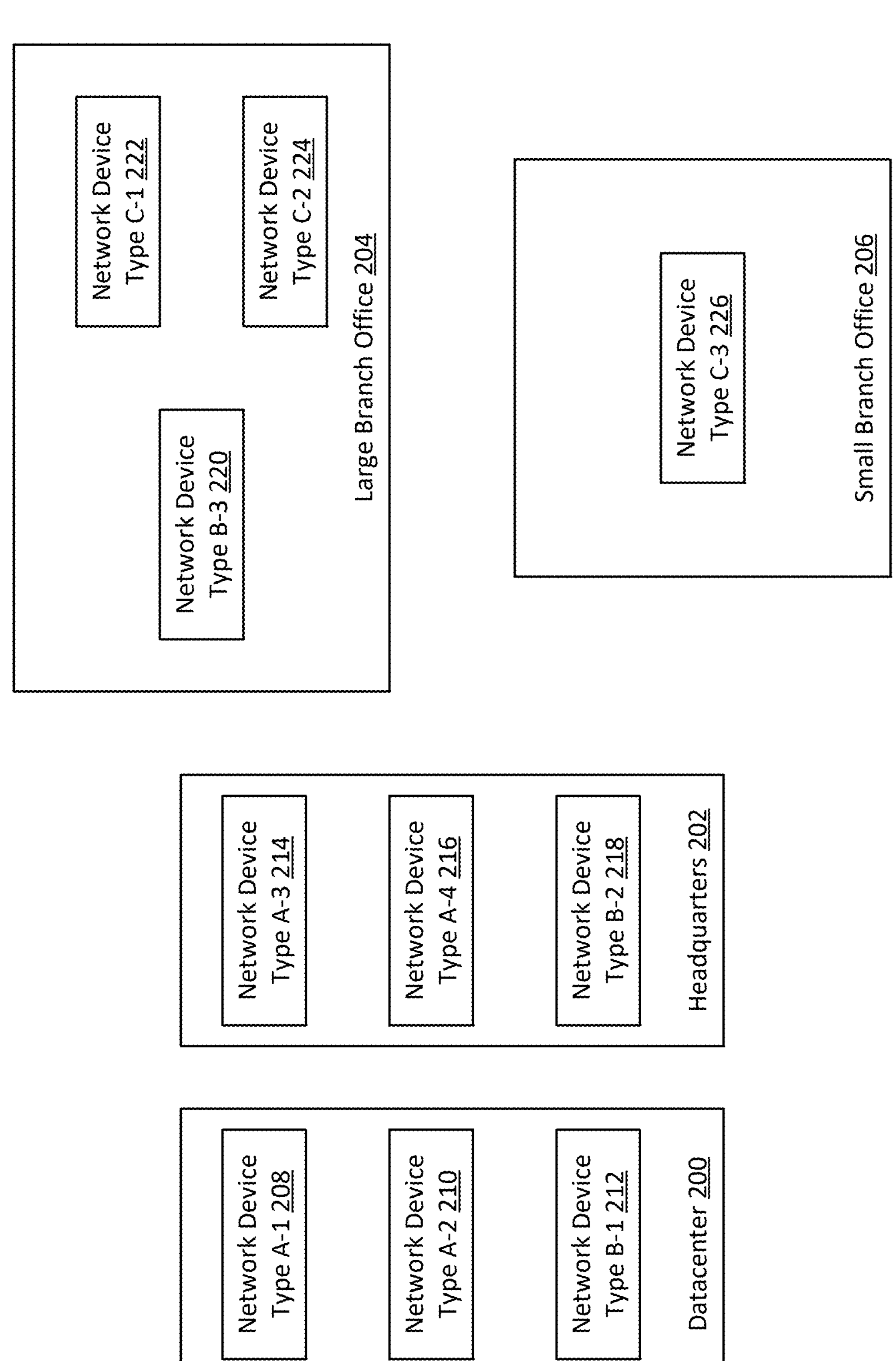
FIG. 2A shows a block diagram of an example of network devices located at various locations, in accordance with one or more examples disclosed herein.
Figure 2B:
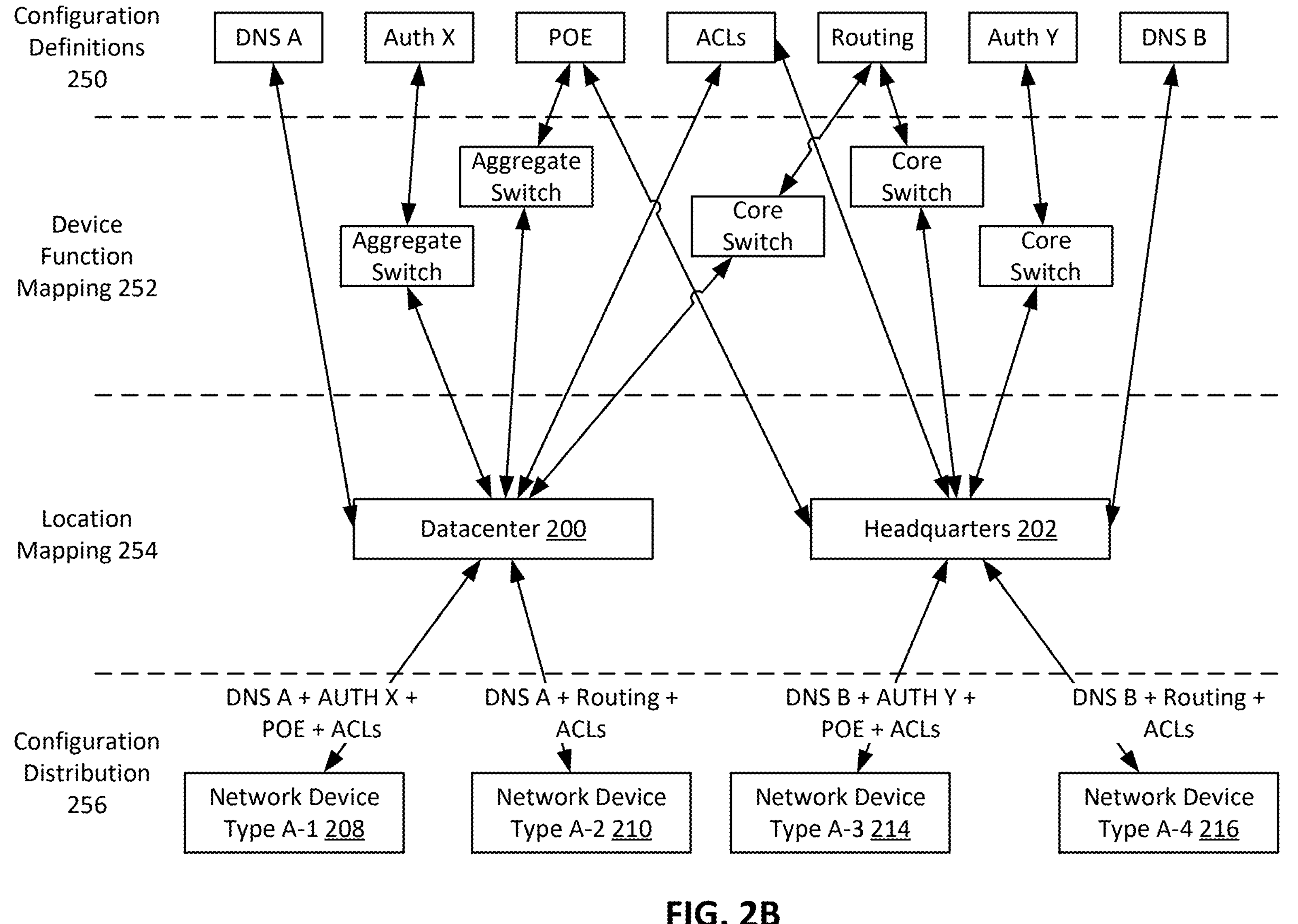
FIG. 2B shows an example of mappings between configuration definitions, device functions, and locations, in accordance with one or more examples disclosed herein.

FIGS. 2A-2C shown an example of automated configuration for multi-functional network devices in accordance with one or more examples disclosed herein. The example shown in FIGS. 2A-2C and discussed below is a highly simplified example intended for explanatory purposes only, and not intended to limit the scope of examples disclosed herein. One of ordinary skill in the art, having the benefit of this disclosure, will appreciate that such a scenario may include any number of different locations, each having any number of network devices; that there may be any number of additional device functions that may be assigned to network devices; that there may be any number of additional and/or other configuration definitions that may form a configuration bundle to be applied to a network device, and the like.

Referring to FIG. 2A, consider a scenario in which a company desires to deploy a network at various locations, including a datacenter 200, a headquarters 202, a large branch office 204, and a small branch office 206.

For the datacenter 200, the company obtains two different types (e.g., different models) of a network device, network device type A and network device type B. Specifically, the company obtains a network device type A-1 208, and a network device type A-2 210, as well as a network device type B-1 212.

For the headquarters 202, the company also obtains the same two different types of a network device, network device type A and network device type B. Specifically, the company obtains a network device type A-3 214, and a network device type A-4 216, as well as a network device type B-2 218.

For the large branch office 204, the company obtains one device of network device type B, the network device type B-3 220, as well as two network devices of network device type C, the network device type C-1 222 and the network device type C-2 224. For the small branch office 206, the company obtains one device of network device type C, the network device type C-3.

In such a scenario, each network device type is configured with a common firmware at a factory (e.g., a factory default firmware), such that all network device type A devices have a common factory default firmware, all network device type B devices have a common factory default firmware, and all network device type C devices have a common factory default firmware. The various network devices are not pre-configured with any particular customer specific configurations prior to deployment at the various locations.

In this scenario, once the network devices are installed at the various locations, with various ports connected as planned, and at least one port connected to an external network (e.g., the Internet), the network devices are all configured to, once powered on, connect to an onboarding service (e.g., the onboarding service 100 of FIG. 1) maintained by the entity from which the network devices were obtained. Said another way, the network devices may be factory configured with a URL, hostname, or the like of the onboarding service, and to attempt to connect to that onboarding service when powered on. That entity also provides services for managing the network devices, and the onboarding service is part of the services provided.

In one or more examples, each network device provides a serial number (e.g., a device identifier) to the onboarding service. The onboarding service uses the serial numbers to identify the entity that obtained the network devices, and also determines a particular cloud management service (e.g., the cloud management service 102 of FIG. 1) instance that is associated with the entity that obtained the network devices. As an example, the service provider may configure a cloud management service instance specifically for the entity that obtained the network devices. As another example, the service provider may have a cloud management service instance configured for providing network device management service for any number of entities that obtain network devices.

In one or more examples, once the onboarding service identifies the appropriate cloud management service, the onboarding service re-directs the network devices to the cloud management service. As an example, the onboarding service may provide a URL of the cloud management service to the network devices, and the network devices may, in turn, be configured to connect to the cloud management service using the provided URL.

In one or more examples, once the network devices connect to the cloud management services, the network devices communicate information to the cloud management service. Such information may include information about the device (e.g., serial number, model, and the like), as well as telemetry information. Telemetry information may be any information about the device or its operation after the device is powered on. As an example, a network device may monitor network traffic seen on ports of the network device, and send to the cloud management service telemetry information derived from the network traffic, such as protocols being used in the network traffic, port speeds, and the like. As another example, telemetry information may include various types of information discovered about devices to which the network device is connected, such as LLDP information about the other devices. The information transmitted from a network device to the cloud management service may also include any other information about the network device, such as the location at which the network device is deployed.

In one or more examples, the cloud management service provides the information received from the network devices to a device function assigner (e.g., the device function assigner 104 of FIG. 1). The device function assigner assesses the information received from a network device in order to assign a device function to the network device.

As an example, the device function assigner may assign a device function of VPNC to each of network device type B-1 212 at the datacenter 200 location and the network device type B-2 218 at the headquarters 202 location based on the various information received by the cloud management service from those devices. The device function assigner may also assign a device function of mobility gateway to the network device type B-3 220 at the large branch office 204, a device function of campus AP to the network device type C-1 222 and the network device type C-2 224 at the large branch office 204. The device function assigner may also assign a device function of microbranch AP to the network device type C-3 at the small branch office 206. Each of these network devices (e.g., 212, 218, 222, 224, and 226) may have their assigned device functions, along with the location at which they are deployed, assessed by a configuration bundle mapper (e.g., the configuration bundle mapper 206 of FIG. 1) in order to determine a configuration bundle for the network devices, which may then be pushed to the network devices to configure the network devices. The details of such mappings and configurations are omitted from this example for the sake of clarity. Instead, the remainder of this example will focus on the configuration of the four network device type A devices (e.g., 208, 210, 214, 216) located at the datacenter 200 and the headquarters 202.

The network device type A-2 210 at the datacenter 200 and the network device type A-4 216 at the headquarters 202 may each have multiple high-speed connections to other network devices and process network traffic from a variety of virtual local area networks (VLANs). This telemetry information, along with other relevant information received at the cloud management service from the devices, causes the device function mapper to assign each of these devices a device function of a core switch. The network device type A-1 and the network device type A-3 may each have multiple connections to end-points or lower speed network devices. This telemetry information, along with other relevant information received at the cloud management service from the devices, causes the device function mapper to assign each of these devices a device function of aggregate switch.

In one or more examples, the device function assignments for the four network device type A devices (e.g., 208, 210, 214, 216) are provided from the device function assigner of the cloud management service to the configuration bundle mapper of the cloud management service. The configuration bundle mapper, in this example, is configured with a mapping between various configuration definitions and device functions and/or locations.

The mapping for core switches and aggregate switches at the datacenter 200 and headquarters 202 locations is shown in FIG. 2B. Specifically, configuration definitions 250 are mapped to either locations, or a combination of device function and location, as shown in the device function mapping 252 and the location mapping 254.

As shown in FIG. 2B, a configuration definition DNS A is mapped to the datacenter 200, meaning that all network devices at the datacenter 200 should be configured to use the DNS A. A configuration definition Auth X is mapped to aggregate switches at the datacenter 200, meaning that network devices assigned the aggregate switch device function that are deployed at the datacenter 200 location should be configured to use the Auth X authorization technique. A configuration definition POE is mapped to aggregate switches at the datacenter 200, meaning that network devices assigned the aggregate switch device function that are deployed at the datacenter 200 location should be configured to use POE. Additionally, the configuration definition POE is mapped to the headquarters 202, meaning that all network devices located at the headquarters 202 location should be configured to use POE. A configuration definition ACLs is mapped to both the datacenter 200 and the headquarters 202, meaning that the network devices at both locations should be configured with a common set of ACLs for access control purposes. A configuration definition Routing is mapped to a device function of core switch at both the datacenter 200 and the headquarters 202, meaning that network devices at both locations that are assigned a core switch device function should be configured with routing functionality. A configuration definition Auth Y is mapped to aggregate switches at the headquarters 202, meaning that network devices assigned the aggregate switch device function that are deployed at the headquarters 202 location should be configured to use the Auth Y authorization technique. Lastly, a configuration definition DNS B is mapped to the headquarters 202, meaning that all network devices at the headquarters 202 should be configured to use the DNS B.

In one or more examples, based on the above-described mappings, as shown in FIG. 2B, the network device type A-1 208 of FIG. 2A, which is located at the datacenter 200 location, is mapped to a configuration bundle that includes DNS A, Auth X, POE, and ACLs configuration definitions. The network device type A-2 210 of FIG. 2A, which is located at the datacenter 200 location, is mapped to a configuration bundle that includes DNS A, Routing, and ACLs configuration definitions. The network device type A-3 214 of FIG. 2A, which is located at the headquarters 202 location, is mapped to a configuration bundle that includes DNS B, Auth Y, POE, and ACLs configuration definitions. The network device type A-4 216 of FIG. 2A, which is located at the headquarters 202 location, is mapped to a configuration bundle that includes DNS B, Routing, and ACLs configuration definitions. The results of the configuration bundle mappings are shown in tabular form in the Configuration Distribution Table 270, which is shown in FIG. 2C.

In one or more examples, once the configuration bundle mapping has been performed by the configuration bundle mapper, the various configuration definitions in the configuration bundles for each of the four devices are used to configure the four devices. Thus, although each of the four devices are the same device type, and in the same factory default state, with a common firmware, at the time of deployment, using examples disclosed herein, these devices are configured differently based on their respective assigned device functions and locations.

Figure 3:
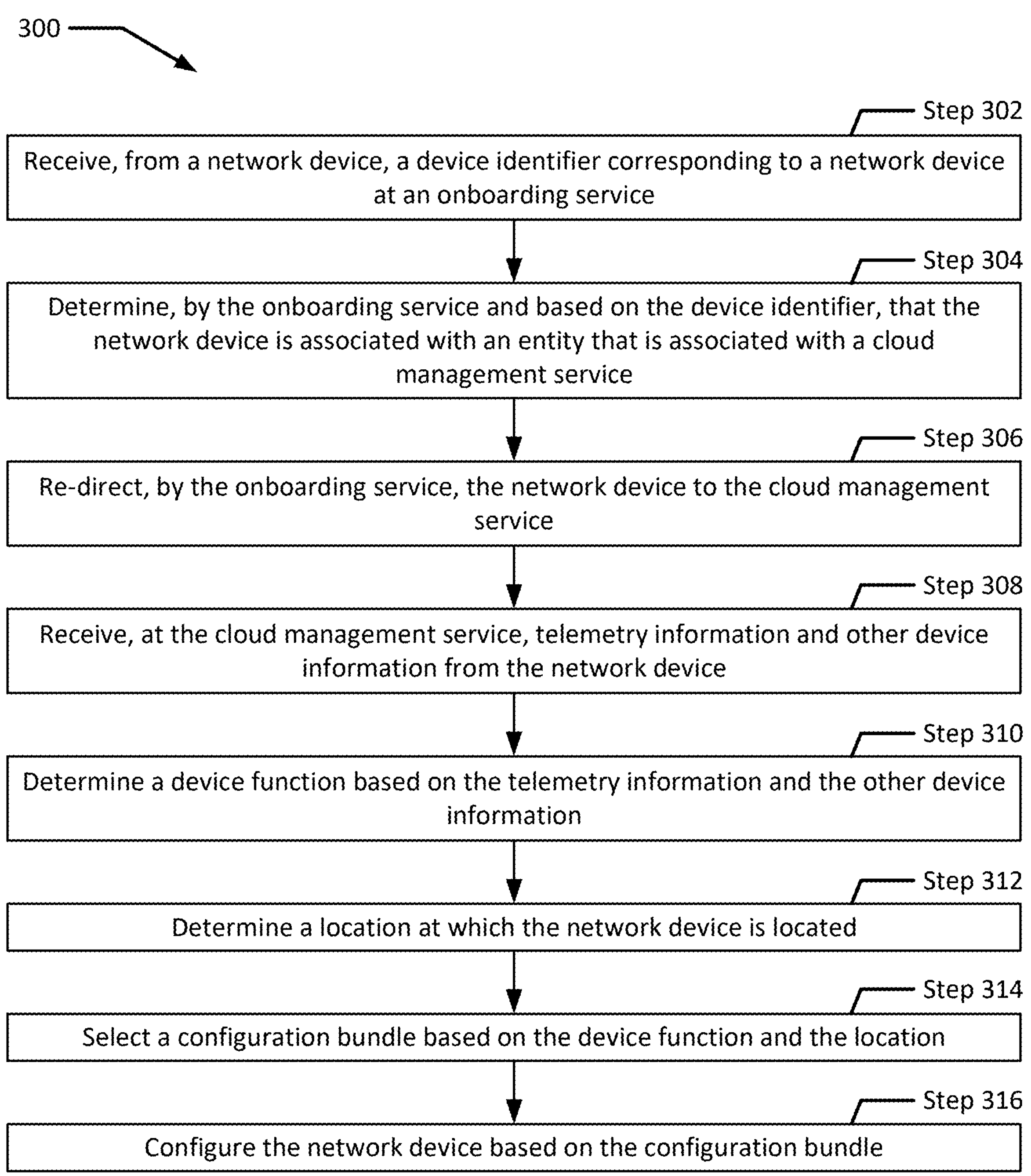
FIG. 3 illustrates an overview of an example method for automatically configuring multi-functional network devices, in accordance with one or more examples disclosed herein.

FIG. 3 illustrates an overview of an example method 300 for automated configuration for multi-functional network devices, in accordance with one or more examples disclosed herein.

The method 300 may be performed, at least in part, by one or more devices and/or components of the system shown in FIG. 1. As such, all or any portion of the method 300 may be performed, for example, by a cloud management service (e.g., the cloud management service 102 of FIG. 1), a device function assigner e.g., the device function assigner 104 of FIG. 1), a configuration bundle mapper (e.g., the configuration bundle mapper 106 of FIG. 1), and/or an onboarding service (e.g., the onboarding service 100 of FIG. 1).

While the various steps in the flowchart shown in FIG. 3 are presented and described sequentially, some or all of the steps may be executed in different orders, some or all of the steps may be combined or omitted, and some or all of the steps may be executed in parallel with other steps of FIG. 3 and/or steps not shown in FIG. 3.

In Step 302, the method 300 includes receiving, from a network device (e.g., any of the network devices 110, 112, 116, 118 of FIG. 1, any of the network devices 208, 210, 212, 214, 216, 218, 220, 222, 224, and 226 of FIG. 2), a device identifier corresponding to the network device at an onboarding service (e.g., the onboarding service 100 of FIG. 1). In one or more examples, the device identifier may be any item of information that uniquely identifies a network device (e.g., serial number, MAC address, and the like). In one or more examples, the network device is pre-configured with information associated with the onboarding service, and to connect to the onboarding service when connected to a network and powered on. As an example, the network device may be pre-configured with a host name and/or URL of the onboarding service, and to attempt to connect to the onboarding service using the same when connected to a network and powered on. In one or more examples, the network device is further configured to transmit the device identifier to the onboarding service.

In Step 304, the method 300 includes determining, by the onboarding service (e.g., the onboarding service 100 of FIG. 1) and based on the device identifier, that the network device (e.g., any of the network devices 110, 112, 116, 118 of FIG. 1, any of the network devices 208, 210, 212, 214, 216, 218, 220, 222, 224, and 226 of FIG. 2), is associated with an entity that is associated with a cloud management service (e.g., the cloud management service 102 of FIG. 1). In one or more examples, the onboarding service uses the device identifier received from the network device to determine an entity that obtained the network device (e.g., a customer that purchased the network device). In one or more examples, an instance of a cloud management service is associated with such an entity by a service provider. Thus, by determining the entity that obtained the network device using the device identifier, the onboarding service may identify an appropriate instance of the cloud management service that is associated with the network device. As an example, the onboarding service may perform a lookup using the device identifier to identify the entity that obtained the network device, and then use the entity to identify the appropriate cloud management service associated with the entity.

In Step 306, the method 300 includes re-directing, by the onboarding service (e.g., the onboarding service 100 of FIG. 1), the network device (e.g., any of the network devices 110, 112, 116, 118 of FIG. 1, any of the network devices 208, 210, 212, 214, 216, 218, 220, 222, 224, and 226 of FIG. 2) to the cloud management service (e.g., the cloud management service 102 of FIG. 1). In one or more examples, re-directing the network device to the cloud management service includes providing information to the network device to allow the network device to connect to the cloud management service. As an example, the onboarding service may provide to the network device a URL of the cloud management service, and the network device may use the URL to connect to the cloud management service over a network.

In Step 308, the method 300 includes receiving, at the cloud management service (e.g., the cloud management service 102 of FIG. 1), telemetry information and other device information from the network device (e.g., any of the network devices 110, 112, 116, 118 of FIG. 1, any of the network devices 208, 210, 212, 214, 216, 218, 220, 222, 224, and 226 of FIG. 2). In one or more examples, after connecting to the cloud management service, the network device may be pre-configured to transmit telemetry information and other device information to the cloud management service. Telemetry information may be any information about the device or its operation after the device is powered on. As an example, a network device may monitor network traffic seen on ports of the network device, and send to the cloud management service telemetry information derived from the network traffic, such as protocols being used in the network traffic, port speeds, and the like. As another example, telemetry information may include various types of information discovered about devices to which the network device is connected, such as LLDP information about the other devices. Other device information may include any other information about, associated with, or corresponding to the network device. Such information may include, but is not limited to, device information (e.g., serial number, MAC address(es), physical configuration information, model, and the like), and any other relevant information (e.g., information identifying the location at which the network device is located). In one or more examples, all or any portion of the information transmitted from a network device to the cloud management service may be provided to a device function assigner (e.g., the device function assigner 104 of FIG. 1).

In Step 310, the method 300 includes determining a device function based on the telemetry information and the other device information. The device function for the network device may be determined, for example, by a device function assigner (e.g., the device function assigner 104 of FIG. 1) of a cloud management service (e.g., the cloud management service 102 of FIG. 1). In one or more examples, a device function may be one of any number of pre-defined device functions, which reflect the position of and intended operation of the network device within a network. The device function assigner of the cloud management service may be configured with any number of different device functions that may be assigned to network devices. Examples of device functions which may be assigned to a network device include, but are not limited to, core switch, aggregate switch, access switch, mobility gateway, branch gateway, virtual private network (VPN) concentrator (VPNC), campus access point (AP), microbranch AP, and the like. In addition to the aforementioned examples, any number of other device functions may be defined and assigned to network devices based on telemetry information and other device information without departing from the scope of examples disclosed herein. As an example, the device function assigner may assess the telemetry information to determine characteristics about the network traffic seen at ports of the network device (e.g., protocols used in such network traffic), connectivity information for the network device (e.g., obtained using one or more discovery protocols), and any other relevant telemetry information, along with various items of information about the network device (e.g., device identifier, device model, and the like), to map the network device to a device function.

In Step 312, the method 300 includes determining a location (e.g., the location A 108, the location B 114 of FIG. 1, the datacenter 200, the headquarters 202, the large branch office 204, the small branch office 206 of FIG. 2) at which the network device (e.g., any of the network devices 110, 112, 116, 118 of FIG. 1, any of the network devices 208, 210, 212, 214, 216, 218, 220, 222, 224, and 226 of FIG. 2) is located. In one or more examples, the location at which a network device is located may be communicated to the cloud management service by the network device as part of the other device information received by the cloud management service, or may be obtained by the cloud management service in any other way (e.g., provided separately to the cloud management service after the entity deploying the network device obtains and/or deploys the network device).

In Step 314, the method 300 includes selecting a configuration bundle based on the device function and the location. In one or more examples, a configuration bundle is a set of configuration definitions for various types of functionality for which a network device may be configured. Examples of such configuration definitions may include, but are not limited to, that a network device is to use a particular domain name system (DNS), that a network device is to be configured with a certain authentication technique, that a network device is to be configured to use Power over Ethernet (POE), that a network device is to be configured to perform routing functions, that a network device is to be configured with certain access control techniques (e.g., access control lists (ACLs), role definitions, and the like), that a network device is to be configured to participate in any number of network protocols, and/or any other types of functionality that may be configured on a network device. Such configuration definitions may be associated with one or more device functions, one or more locations, or a combination of device function and location, and the set of configuration definitions associated with a particular device function and/or location may be included in a configuration bundle mapped to a network device at a particular location.

In Step 316, the method 300 includes configuring the network device (e.g., any of the network devices 110, 112, 116, 118 of FIG. 1, any of the network devices 208, 210, 212, 214, 216, 218, 220, 222, 224, and 226 of FIG. 2) based on the configuration bundle selected in Step 314. In one or more examples, configuring the network device based on the configuration bundle includes configuring the network device to include and be able to execute the various functionalities of the configuration definitions included in the configuration bundle.

FIG. 4 illustrates a block diagram of a computing device 400, in accordance with one or more examples disclosed herein. The computing device 400 may be an example of all or any portion of the components shown in FIG. 1 (e.g., the onboarding service 100, the cloud management service 102, the device function assigner 104, the configuration bundle mapper 106) and described above, and/or of the computing device 500, described below. As discussed above in the descriptions of FIG. 1, FIGS. 2A-2C, and FIG. 3, the computing device 400 may be used to implement all or any portion of the various components shown in FIG. 1 and described above and/or to perform all or any portion of the method 300 shown in FIG. 3 and described above.

The computing device 400 may include one or more processors 402 and memory 404. The memory 404 may include a non-transitory computer-readable medium that stores programming for execution by one or more of the one or more processors 402. In this implementation, one or more modules within the computing device 400 may be partially or wholly embodied, at least in part, as software for performing any functionality described in this disclosure. The computing device 400 may be, for example, configured to perform the method 300 shown in FIG. 3 and described above, by executing instructions included in the memory 404 and executed by the one or more processors 402.

For example, the memory 404 may include instructions 406 to receive, from a network device, a device identifier corresponding to a network device at an onboarding service (e.g., as described above in reference to Step 302 of FIG. 3).

For example, the memory 404 may include instructions 408 to determine, by the onboarding service and based on the device identifier, that the network device is associated with an entity that is associated with a cloud management service (e.g., as described above in reference to Step 304 of FIG. 3).

For example, the memory 404 may include instructions 410 to re-direct, by the onboarding service, the network device to the cloud management service (e.g., as described above in reference to Step 306 of FIG. 3).

For example, the memory 404 may include instructions 412 to receive, at the cloud management service, telemetry information and other device information from the network device (e.g., as described above in reference to Step 308 of FIG. 3).

For example, the memory 404 may include instructions 414 to determine a device function based on the telemetry information and the other device information (e.g., as described above in reference to Step 310 of FIG. 3).

For example, the memory 404 may include instructions 416 to determine a location at which the network device is located (e.g., as described above in reference to Step 312 of FIG. 3).

For example, the memory 404 may include instructions 418 to select a configuration bundle based on the device function and the location (e.g., as described above in reference to Step 314 of FIG. 3).

For example, the memory 404 may include instructions 420 to configure the network device based on the configuration bundle (e.g., as described above in reference to Step 316 of FIG. 3).

FIG. 5 illustrates a block diagram of a computing device 500, in accordance with one or more examples of this disclosure. As discussed above, examples described herein may be implemented, at least in part, using computing devices, and the computing device 500 shown in FIG. 5 may be such a computing device. For example, all or any portion of the components shown in FIG. 1 (e.g., the onboarding service 100, the cloud management service 102, the device function assigner 104, the configuration bundle mapper 106)

may be implemented, at least in part using a computing device such as the computing device 500, and may include all or any portion of the components of the computing device 500 shown in FIG. 5 and described below.

In one or more examples, a computing device (e.g., the computing device 500) is any device, portion of a device, or any set of devices capable of electronically processing instructions and may include, but is not limited to, any of the following: one or more processors (e.g. components that include circuitry) (e.g., the processor 502), memory (e.g., random access memory (RAM)) (not shown), input and output device(s) (e.g., the non-persistent storage 506), non-volatile storage hardware (e.g., solid-state drives (SSDs), persistent memory (Pmem) devices, hard disk drives (HDDs) (not shown)), one or more physical interfaces (e.g., network ports, storage ports) (e.g., the persistent storage 506), any number of other hardware components (not shown), and/or any combination thereof. As used herein, a processor may be any component that can be configured to execute operations, processes, threads, and the like. In some examples, a computing device (e.g., the computing device 500) may include any number of homogeneous or heterogeneous processors of any type.

The computing device 500 may include a communication interface 512 (e.g., Bluetooth interface, infrared interface, network interface, optical interface, any other type of communication interface), input devices 510, output devices 508, and numerous other elements (not shown) and functionalities. Each of these components is described below.

In one or more examples, the computer processor(s) 502 may be an integrated circuit for processing instructions. For example, the computer processor(s) may be one or more cores or micro-cores of a processor. The processor 502 may be a general-purpose processor configured to execute program code included in software executing on the computing device 500. The processor 502 may be a special purpose processor where certain instructions are incorporated into the processor design. The processor 502 may be a central processing unit (CPU), a multi-core CPU, an application specific integrated circuit (ASIC), a graphics processing unit (GPU), a data processing unit (DPU), a tensor processing units (TPU), an associative processing unit (APU), a vision processing units (VPU), a quantum processing unit (QPU), and/or various other processing units that use special purpose hardware (e.g., field programmable gate arrays (FPGAs), System-on-a-Chips (SOCs), digital signal processors (DSPs)). Although only one processor 502 is shown in FIG. 5, the computing device 500 may include any number of processors without departing from the scope of examples disclosed herein.

The computing device 500 may also include one or more input devices 510, such as a touchscreen, keyboard, mouse, microphone, touchpad, electronic pen, motion sensor, or any other type of input device. The input devices 510 may allow a user to interact with the computing device 500. In one or more examples, the computing device 500 may include one or more output devices 508, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 502, non-persistent storage 504, and persistent storage 506. Many different types of computing devices exist, and the aforementioned input and output device(s) may take other forms. In some instances, multimodal systems can allow a user to provide multiple types of input/output to communicate with the computing device 500.

Further, the communication interface 512 may facilitate connecting the computing device 500 to a network (not shown) (e.g., a local area network (LAN), a wide area network (WAN) such as the Internet, mobile network, or any other type of network) and/or to another device, such as another computing device. The communication interface 512 may perform or facilitate receipt and/or transmission of wired or wireless communications using wired and/or wireless transceivers of any type and/or technology. Examples include, but are not limited to, those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 512 may also include one or more Global Navigation Satellite System (GNSS) receivers or transceivers that are used to determine a location of the computing device 500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, and the like may be passed, forwarded, or transmitted via any suitable means including memory sharing, message passing, token passing, network transmission, or the like.

All or any portion of the components of the computing device 500 may be implemented in circuitry. For example, the components can include and/or can be implemented using electronic circuits or other electronic hardware, which can include one or more programmable electronic circuits (e.g., microprocessors, GPUs, DSPs, FPGAs, CPUs, CAMs, and/or other suitable electronic circuits), and/or can include and/or be implemented using computer software, firmware, or any combination thereof, to perform the various operations described herein. In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

In the above description, numerous details are set forth as examples described herein. It will be understood by those skilled in the art (who also have the benefit of this disclosure) that one or more examples described herein may be practiced without these specific details, and that numerous variations or modifications may be possible without departing from the scope of the examples described herein. Certain details known to those of ordinary skill in the art may be omitted to avoid obscuring the description.

Specific details are provided in the description above to provide a thorough understanding of the aspects and examples provided herein. However, it will be understood by one of ordinary skill in the art that the aspects and examples may be practiced without these specific details. For clarity of explanation, in some instances the present technology may be presented as including functional blocks that may include devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects of examples disclosed herein.

Individual aspects may be described above as a process or method which is depicted as a flowchart, a flow diagram, a data flow diagram, a structure diagram, or a block diagram. Although a flowchart or flow diagram may describe the operations as a sequential process, many of the operations can be performed in parallel or concurrently. In addition, the order of the operations may be re-arranged. A process may be terminated when its operations are completed, but may have additional steps not included in a drawing. A process may correspond to a method, a function, a procedure, a subroutine, a subprogram, and the like. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, a network device, or a processing device (e.g., one or more processors) to perform a certain function or group of functions. Portions of computer resources used can be accessible over a network. The computer executable instructions may be, for example, binaries, intermediate format instructions such as assembly language, firmware, source code, and the like. Examples of computer-readable media that may be used to store instructions, information used, and/or information created during methods according to described examples include magnetic or optical disks, flash memory, USB devices provided with non-volatile memory, networked storage devices, and the like.

In the above description of the figures, any component described with regard to a figure, in various examples described herein, may be equivalent to one or more same or similarly named and/or numbered components described with regard to any other figure. For brevity, descriptions of these components may not be repeated with regard to each figure. Thus, each and every example of the components of each figure is incorporated by reference and assumed to be optionally present within every other figure having one or more same or similarly named and/or numbered components. Additionally, in accordance with various examples described herein, any description of the components of a figure is to be interpreted as an optional example, which may be implemented in addition to, in conjunction with, or in place of the examples described with regard to a corresponding one or more same or similarly named and/or numbered component in any other figure.

Throughout the application, ordinal numbers (e.g., first, second, third) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operative connection, and variations thereof, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While examples discussed herein have been described with respect to a limited number of examples, those skilled in the art, having the benefit of this disclosure, will appreciate that other examples can be devised which do not depart from the scope of examples as disclosed herein. Accordingly, the scope of examples described herein should be limited only by the attached claims.

What is claimed is:

1. A system, comprising:

one or more processors; and one or more non-transitory computer readable media storing instructions which, when executed by the one or more processors, cause the one or more processors to:

receive, at a cloud management service, telemetry information and other device information from a network device, wherein:

the network device comprises a factory pre-installed firmware that is common to a plurality of other network devices of a same network device type, the factory pre-installed firmware is configured to facilitate automated configuration of the network device and the plurality of other network devices by the cloud management service, the telemetry information comprises network traffic information about network traffic seen on one or more ports of the network device, and the network traffic information comprises an identification of one or more network protocols identified in a network data unit of the network traffic that is received at the network device;

determine a device function of the network device based on the telemetry information and the other device information;

determine a location at which the network device is located;

select a configuration bundle based on the device function and the location; and configure the network device based on the configuration bundle.

2. The system of claim 1, wherein the device function is a core device, an access device, an access point, or a gateway.

3. The system of claim 2, wherein the access point is a campus access point or a microbranch access point.

4. The system of claim 2, wherein the gateway is a mobility gateway, a branch gateway, or a virtual private network concentrator device.

5. The system of claim 1, wherein the configuration bundle comprises a portion of a plurality of configuration definitions.

6. The system of claim 1, wherein the telemetry information further comprises connectivity information comprising identification of other devices to which the network device is connected.

7. A computer-implemented method, comprising:

receiving, at a cloud management service, telemetry information and other device information from a network device, wherein:

the network device comprises a factory pre-installed firmware that is common to a plurality of other network devices of a same network device type, the factory pre-installed firmware is configured to facilitate automated configuration of the network device and the plurality of other network devices by the cloud management service, the telemetry information comprises network traffic information about network traffic seen on one or more ports of the network device, and the network traffic information comprises an identification of one or more network protocols identified in a network data unit of the network traffic that is received at the network device;

determining a device function of the network device based on the telemetry information and the other device information;

determining a location at which the network device is located;

selecting a configuration bundle based on the device function and the location; and configuring the network device based on the configuration bundle.

8. The computer-implemented method of claim 7, wherein the device function is a core device, an access device, an access point, or a gateway.

9. The computer-implemented method of claim 8, wherein the access point is a campus access point or a microbranch access point.

10. The computer-implemented method of claim 8, wherein the gateway is a mobility gateway, a branch gateway, or a virtual private network concentrator device.

11. The computer-implemented method of claim 7, wherein the configuration bundle comprises a portion of a plurality of configuration definitions.

12. The computer-implemented method of claim 7, wherein the telemetry information further comprises connectivity information comprising identification of other devices to which the network device is connected.

13. A non-transitory computer-readable medium storing programming for execution by one or more processors, the programming comprising instructions to:

receive, at a cloud management service, telemetry information and other device information from a network device, wherein:

the network device comprises a factory pre-installed firmware that is common to a plurality of other network devices of a same network device type, the factory pre-installed firmware is configured to facilitate automated configuration of the network device and the plurality of other network devices by the cloud management service, the telemetry information comprises network traffic information about network traffic seen on one or more ports of the network device, and the network traffic information comprises an identification of one or more network protocols identified in a network data unit of the network traffic that is received at the network device;

determine a device function of the network device based on the telemetry information and the other device information;

determine a location at which the network device is located;

select a configuration bundle based on the device function and the location; and configure the network device based on the configuration bundle.

14. The non-transitory computer-readable medium of claim 13, wherein the configuration bundle comprises a portion of a plurality of configuration definitions.

15. The non-transitory computer-readable medium of claim 13, wherein the telemetry information further comprises connectivity information comprising identification of other devices to which the network device is connected.

* * * * *